United States Patent
Shah et al.

(10) Patent No.: US 7,754,828 B2
(45) Date of Patent: Jul. 13, 2010

(54) LAMINATING ADHESIVE

(75) Inventors: Pankaj V. Shah, Crystal Lake, IL (US); Joseph J. Zupancic, Glen Ellyn, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/317,136

(22) Filed: Dec. 19, 2008

(65) Prior Publication Data

US 2009/0163673 A1    Jun. 25, 2009

Related U.S. Application Data

(60) Provisional application No. 61/008,186, filed on Dec. 19, 2007.

(51) Int. Cl.
    *C08F 283/04* (2006.01)
(52) U.S. Cl. ............... 525/454; 525/408; 525/438; 525/440.12; 525/449
(58) Field of Classification Search ............... 525/454, 525/408, 438, 440.01, 440.12, 449; 528/66
    See application file for complete search history.

(56) References Cited

U.S. PATENT DOCUMENTS

| 2004/0030088 A1* | 2/2004 | Salter et al. ............ 528/59 |
| 2004/0054075 A1* | 3/2004 | Gloeckner et al. ........ 524/601 |
| 2006/0182957 A1* | 8/2006 | Simons ............... 428/355 R |
| 2006/0276614 A1 | 12/2006 | Niemann |

FOREIGN PATENT DOCUMENTS

FR    2233379    1/1975

* cited by examiner

*Primary Examiner*—David Wu
*Assistant Examiner*—Robert Jones, Jr.
(74) *Attorney, Agent, or Firm*—Kenneth Crimaldi

(57) ABSTRACT

A two-component bonding agent composition. The composition contains: (a) an isocyanate component comprising a difunctional isocyanate-terminated prepolymer having polymerized residues of at least one difunctional aromatic isocyanate and at least one difunctional polymer of ethylene oxide, propylene oxide or a combination thereof; (b) a polyol component comprising a triglyceride having hydroxyl functional groups; and (c) an adhesion promoter.

9 Claims, No Drawings

US 7,754,828 B2

LAMINATING ADHESIVE

This application claims the benefit of priority under 35 U.S.C. §119(e) of U.S. Provisional Patent Application No. 61/008,186 filed on Dec. 19, 2007.

The present invention relates to a two-part urethane adhesive employing an adhesion promoter.

Several systems have been used as adhesion promoters for laminates to improve bond strength, especially in the presence of moisture. For example, a polyester-polyphosphoric acid copolymer is disclosed in Fr. Pub. Appl. No. 2,233,379. However, the copolymer requires a multi-step preparation in which a polyester is made, and then allowed to react with polyphosphoric acid. This reference also does not teach use of the copolymer in a urethane adhesive system.

The problem addressed by this invention is to provide an improved urethane adhesive employing an adhesion promoter.

STATEMENT OF THE INVENTION

The present invention is directed to a two-component bonding agent composition. The composition comprises: (a) an isocyanate component comprising an isocyanate-terminated prepolymer having polymerized residues of at least one difunctional aromatic isocyanate; (b) a polyol component comprising a triglyceride having hydroxyl functional groups; and (c) at least one adhesion promoter selected from the group consisting of phosphoric acids and hydroxy-terminated polyesters having polymerized residues of at least one aliphatic $C_2$-$C_6$ diol, at least one aliphatic $C_4$-$C_{10}$ diacid, anhydride or combination thereof, and at least one triol; wherein said hydroxy-terminated polyester has a hydroxyl functionality greater than 2.

The present invention is further directed to a method for producing a two-component bonding agent composition by preparing: (a) an isocyanate component comprising at least one difunctional aromatic isocyanate and a polyol; wherein the difunctional aromatic isocyanate is present in excess; and (b) a polyol component comprising a triglyceride having hydroxyl functional groups; wherein at least one adhesion promoter is added to either the isocyanate or polyol component; wherein said at least one adhesion promoter is selected from the group consisting of phosphoric acids and hydroxy-terminated polyesters having polymerized residues of at least one aliphatic $C_2$-$C_6$ diol, at least one aliphatic $C_4$-$C_{10}$ diacid, anhydride or combination thereof, and at least one triol; wherein said hydroxy-terminated polyesters have a hydroxyl functionality greater than 2.

DETAILED DESCRIPTION OF THE INVENTION

All percentages mentioned herein are by weight (wt %), and temperatures in ° C., unless specified otherwise. As used herein, "bonding agent" is an agent that is suitable for joining itself to at least a first material, and preferably also to a second material. The first and second materials may be the same or different. Multiple layers of material may be joined using the bonding agent. "Bonding agent" encompasses an adhesive, a primer, or any other suitable coating for bonding to a surface. The term "phosphoric acids" includes aqueous phosphoric acid as well as acidic pyrophosphates and polyphosphates. A "triglyceride" is a tri-ester of glycerol, either a natural triglyceride which is a fatty acid ester, or a synthetically modified triglyceride in which one or more fatty acids have been replaced by polyols or modified to contain hydroxyl functionality.

A hydroxy-terminated polyester can be used as an adhesion promoter in the present invention. The polyester can be added to the isocyanate component and/or the polyol component, preferably the polyol component. Preferably, the amount of the polyester is from 0.2% to 6% of the component to which it is added. In some embodiments of the invention, at least 1% of the polyester is added, alternatively at least 1.5%, alternatively at least 2%, alternatively at least 2.5%; in some embodiments, no more than 5% is added, alternatively no more than 4%, alternatively no more than 3.5%. If the polyester is added to both components, the total amount in both components is within the limits stated above, based on the amount of either component. The polyester has polymerized residues of at least one aliphatic $C_2$-$C_6$ diol, at least one aliphatic $C_4$-$C_{10}$ diacid, anhydride or combination thereof, and at least one triol. Diols and triols are used in excess, whereby the hydroxy-terminated prepolymer is OH-terminated. The hydroxy-terminated polyester has a hydroxyl functionality greater than 2. In some embodiments of the invention, the aliphatic $C_4$-$C_{10}$ diacid, anhydride or combination thereof comprises polymerized residues of an anhydride selected from maleic anhydride and tetrahydrophthalic anhydride and/or a diacid. In some aspects of these embodiments, the diacid and/or anhydride is selected from adipic acid, fumaric acid, maleic anhydride, succinic anhydride, azelaic acid, sebacic acid and combinations thereof. In some embodiments of the invention, the aliphatic $C_2$-$C_6$ diol is diethylene glycol, ethylene glycol, neopentyl glycol, 1,6-hexanediol, dipropylene glycol, propylene glycol, 1,4-butanediol, 2-methyl-1,3-propanediol and combinations thereof. In some embodiments of the invention, the triol is trimethylol propane, trimethylol ethane or glycerol. In some embodiments of the invention, the hydroxy-terminated polyester has $M_w$ from 1000 to 10,000. In some embodiments, $M_w$ is at least 2000, alternatively at least 3000, alternatively at least 3500, alternatively at least 4000, alternatively at least 4500, alternatively at least 5000; in some embodiments, $M_w$ is no greater than 8000, alternatively no greater than 7000, alternatively no greater than 6000, alternatively no greater than 5000.

A phosphoric acid adhesion promoter may comprise a commercially available aqueous phosphoric acid, preferably 85% phosphoric acid, or a liquid or solid acidic pyrophosphate or polyphosphate. The phosphoric acid adhesion promoter can be added to the isocyanate component and/or the polyol component, preferably the polyol component. Preferably, the amount of the phosphoric acid adhesion promoter is from 0.01% to 1% of the component to which it is added. In some embodiments of the invention, at least 0.05% of the phosphoric acid adhesion promoter is added, alternatively at least 0.1%, alternatively at least 0.15%; in some embodiments, no more than 0.5% is added, alternatively no more than 0.3%. If the phosphoric acid adhesion promoter is added to both components, the total amount in both components is within the limits stated above.

The isocyanate component comprises an isocyanate-terminated prepolymer having polymerized residues of at least one difunctional aromatic isocyanate. Either a polyisocyanate or another isocyanate-terminated prepolymer can be employed to make the isocyanate-terminated prepolymer. When a polyisocyanate is employed, preferably it is an aromatic diisocyanate. Examples of suitable diisocyanates include those based on toluene diisocyanate (TDI), diphenyl methane diisocyanate (MDI), isomers thereof or mixtures thereof. MDI is preferred, especially a mixture of 4,4' and 2,4' isomers. Isocyanate-terminated prepolymers of a polyisocyanate and a polyol may also be employed. The difunctional aromatic isocyanate or difunctional isocyanate-terminated prepolymer is mixed in the isocyanate component with a polyol to form the isocyanate-terminated prepolymer. In some embodiments of the invention, the polyol mixed into the isocyanate component is at least one difunctional polymer of ethylene oxide, propylene oxide or a combination thereof. Preferably, the average molecular weight (Mn) of the difunctional polyol is from 300 to 650, alternatively from 350 to 550, alternatively from 350 to 500.

The polyol component comprises a triglyceride having hydroxyl functional groups. The triglyceride may be a naturally occurring triglyceride having hydroxyl functionality, e.g., castor oil, or a synthetically modified triglyceride, e.g., one which has reacted with an acid anhydride and then with ethylene oxide or propylene oxide, or one which has been partially transesterified with a polyol, or one which has been epoxidized and then ring-opened, or one which has been hydroformylated. Several methods for producing triglycerides with hydroxyl functionality are described in U.S. Pat. App. Pub. No. 2006/0194974. Preferably, the triglyceride has at least two hydroxyl groups per molecule, more preferably at least three. In some embodiments of the invention, the polyol component comprises at least 50% of a triglyceride having hydroxyl functional groups, alternatively at least 70%, alternatively at least 80%, alternatively at least 90%, alternatively at least 95%. In a preferred embodiment of the invention, the triglyceride is castor oil. In some embodiments of the invention, the polyol component further comprises a hydroxy functionalized polyester of molecular weight (Mn) of 250 to 3000. In some embodiments of the invention, a hydroxy functionalized polyester includes polyether glycols such as, polyethylene glycol, polypropylene glycol, poly (ethylene glycol-propylene glycol), polybutylene glycol, poly(tetramethylene ether glycol), poly caprolactone, polyesters based upon ethylene glycol, propylene glycol, diethylene glycol, triethylene glycol, butylene glycol, 1,4-butanediol, 2-methyl-1,3-propanediol, 1,6-hexanediol, neopentyl glycol, 1,4-cyclohexanedimethanol, adipic acid, sebacic acid, azelaic acid, phthalic anhydride, isophthalic acid, terephthalic acid, 1,4-cyclohexane dicarboxylic acid, and caprolactone.

In the two-component system of this invention, the relative proportions of isocyanate groups to isocyanate-reactive groups may vary as desired, preferably within a molar ratio of NCO/OH groups of 0.9:1 to 2:1. In some embodiments of the invention, the NCO/OH group molar ratio is from 0.9:1 to 1.5:1, alternatively from 1:1 to 1.4:1, alternatively from 1.05:1 to 1.3:1.

As gathered from the foregoing, the system of the present invention contemplates the employment of two components, which preferably are mixed using a suitable mixer (e.g., an electrically, pneumatically, or an otherwise powered mechanical mixer, or a static mixer) prior to or during application to a substrate to form the bonding agent. Thus, the isocyanate component typically will be packaged separately from the polyol component. Mixing may take place at any suitable time prior to the laminating process. All of the present steps may be carried out under ambient room temperature or supra-ambient conditions. For example, the two components may be heated just prior to mixing and applied at elevated temperature during the coating and lamination process. As desired, heating or cooling may be applied to the resulting laminate.

The bonding agent of the present invention is useful for bonding two to four substrates together. The substrates may be similar material or dissimilar material. In a preferred embodiment, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. In a preferred embodiment, the substrate layers are provided in the form of rolls of substrate material. The sheets may be on the order of 0.5 to 10 mils in thickness. Larger thicknesses are also possible, as are smaller thicknesses (e.g., on the order of 5 or more microns).

The compositions of the present invention can be applied to desired substrates using conventional application techniques such as solvent-less laminators, rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. The bonding agent is particularly attractive for packaging and sealing applications for laminating plastic films, metal films or metallized plastic films. Especially preferred films include low density polyethylene, high density polyethylene, polypropylene (cast, blown oriented, biaxially drawn), nylon, polystyrene, co-extruded films, polyester film, ceramic (SiOx, AlOx) coated film (polyester, nylon, etc.), polyacrylic acid-coated film (polyester, nylon, etc.), polyvinylidene chloride coated film, metallized film (polyester, polypropylene, etc.).

EXAMPLES

Example 1

Synthesis of Hydroxy-Terminated Polyester Adhesion Promoter

| Item | Monomer/Intermediate | Charge (g) |
| --- | --- | --- |
| 1 | Trimethylolpropane | 26.99 |
| 2 | Diethylene Glycol | 1128.30 |
| 3 | Adipic Acid | 339.79 |
| 4 | Maleic Anhydride | 531.14 |
| 5 | FASCAT 4100 | 0.27 |

1. Charge Items 1, 2, 3, 4, and 5 to reactor at ambient temperature (ca. 25° C.).
2. Heat reactor to 100° C. over a 0.50 Hr interval with nitrogen purge.
3. When resin reaches 100° C. continue heating to 175° C. at a rate of ca. 2° C./mins.
4. When resin reaches 175° C. hold resin at 175° C. for 0.75 Hrs.
5. Increase temperature to 225±3° C. at a rate of ca. 2° C./mins.;
6. Hold resin at 225±3° C. for 1.0 Hrs.; sample resin for AV.
7. When AV=15 apply vacuum (ca. 500 mm), sample resin at 1 Hr intervals.
8. Maintain temperature at 225±3° C., Decrease vacuum to ca. 250 mm gradually to avoid foaming, continue sampling at 1 Hr. intervals
9. When AV=3.0; then start cooling resin to 100° C., break vacuum with nitrogen.
10. Filter and package resin at ca. 100 to 125° C.

The final resin had the following properties: Acid Value (AV) 0.64, Hydroxyl Number (OHN) 163.73, Mn 1600, Mw 5500, Viscosity at 25° C. 5825 cps.

Examples 2-5

Two-Component Systems

|  | Example 2 | Example 3 | Example 4 | Example 5 |
|---|---|---|---|---|
| Part A (NCO) description |  |  |  |  |
| Liquid 4,4' MDI | 32.5 | 32.5 |  | 59.87 |
| Lupranate MI | 32.5 | 32.5 | 60 |  |
| PPG 425 | 30 | 30 |  |  |
| phos. acid solid crystal |  |  |  | 0.2 |
| Ex. 1 polyester |  |  |  | 2.5 |
| PPG 2000 | 5 | 5 |  |  |
| AA standard castor oil |  |  | 40 | 37.43 |
| % NCO | 15.72 | 15.72 | 15.25 | 15.15 |
| Viscosity @ 25 C. | 8500 | 8500 | 5400 |  |
| Part B (polyol) description | AA std. castor oil |  | AA std. castor oil | AA std. castor oil |
| AA std. castor oil | 100 | 98 | 100 | 100 |
| 85% ortho phos. acid |  | 0.2 |  |  |
| Ex. 1 polyester |  | 1.8 |  |  |
| Portion Part A | 49.4 | 49.5 | 50.3 | 50.3 |
| Portion Part B | 50.6 | 50.5 | 49.7 | 49.7 |
| Eq NCO/Eq OH | 1.25 | 1.25 | 1.25 | 1.25 |
| Viscosity (mPas @ 35 C.) | 1085 | 1288 | 1134 | 1448 |
| Pot life (min) | 14 | 10 | 12 | 11 |

Examples 6-9

|  | Example 6 | Example 7 | Example 8 | Example 9 |
|---|---|---|---|---|
| Part A (NCO) description |  |  |  |  |
| Liquid 4,4' MDI | 32.5 |  | 32.5 |  |
| Lupranate MI | 32.5 | 60 | 32.5 | 60 |
| PPG 425 | 30 |  | 30 |  |
| phos. acid solid crystal |  |  |  |  |
| Ex. 1 polyester |  |  |  |  |
| PPG 2000 | 5 |  | 5 |  |
| AA standard castor oil |  | 40 |  | 40 |
| % NCO | 15.72 | 15.25 | 15.72 | 15.25 |
| Viscosity @ 25 C. | 8500 | 5400 | 8500 | 5400 |
| Part B (polyol) description |  |  |  |  |
| AA std. castor oil | 97 | 97 | 99.8 | 99.8 |
| polyphos. acid |  |  | 0.2 | 0.2 |
| Ex. 1 polyester | 3 | 3 |  |  |
| Portion Part A | 47.50 | 48.25 | 49.4 | 50.1 |
| Portion Part B | 52.50 | 51.75 | 50.6 | 49.9 |
| Eq NCO/Eq OH | 1.15 | 1.15 | 1.25 | 1.25 |
| Viscosity (mPas @ 35 C.) | 1085 | 1195 |  |  |
| Pot life (min) | 14 | 13 |  |  |

Test Results:

|  | Example 2 | Example 3 | Example 4 | Example 5 |
|---|---|---|---|---|
| 1 d T-peel | Bond Strength g/in (N/15 mm) | | | |
| PE/foil prelam. | 613 (3.58) | 892 (5.15) | 373 (2.14) | 616 (3.59) |
| OPP/MOPP | 169 (1.01)[2] | 330 (1.87)[1] | 96 (0.58)[2] | 230 (1.29)* |
| 7 d T-peel |  |  |  |  |
| PE/foil prelam. | 962 (5.58) | 1092 (6.33) | 540 (3.14) | 728 (4.17) |
| OPP/MOPP | 242 (1.36) | 348 (1.99)** | 118 (0.71) | 332 (1.88)** |
| T-peel after overnight water soak |  |  |  |  |
| PE/foil prelam. | 276 (1.56) | 920 (5.32) | 384 (2.21) | 406 (2.33) |
| OPP/MOPP | 192 (1.15)* | 317 (1.80)** | 107 (0.64)[2] | 315 (1.78)** |

[1]Film Failure (max peel value)
[2]Adhesive Failure (adhesive only on primary, ave)
Cohesive Failure (adh on both films, ave.) on all others
*partial metal transfer
**100% metal transfer Test Results

| Roll # | Primary | Secondary | Structure | 6 | 7 | 8 | 9 |
|---|---|---|---|---|---|---|---|
| | | | | \multicolumn{4}{c}{Ex. No. Bond Strength g/in (N/15 mm)} | | | |
| \multicolumn{8}{c}{1 d T-peel} | | | | | | | |
| 1 | 808.24PE | 92LBT | PE//PET | | | 641 (3.74)[1] | 433 (2.49) |
| 2 | 808.24PE | Foil prelam. | PE//Foil | | | 911 (5.26) | 507 (2.94) |
| 3 | 75 SLP | 75 SLP | OPP/OPP | | | 609 (3.55)[1] | 494 (2.87)[1] |
| 4 | 75 SLP | MOPP | OPP/metallized OPP | | | 271 (1.54)[2] | 192 (1.15)[2] |
| \multicolumn{8}{c}{7 d T-peel} | | | | | | | |
| 1 | 808.24PE | 92LBT | PE//PET | 678 (3.97)[1] | 626 (3.65)[1] | 740 (4.24)[1] | 1062 (6.16)[1] |
| 2 | 808.24PE | Foil prelam. | PE//Foil | 816 (4.69) | 531 (3.08) | 1062 (6.16) | 833 (4.79) |
| 3 | 75 SLP | 75 SLP | OPP/OPP | 566 (3.28)[1] | 337 (1.91)[1] | 685 (4.01)[1] | 554 (3.21)[1] |
| 4 | 75 SLP | MOPP | OPP/metallized OPP | 194 (1.16)[2] | 132 (0.79)[2] | 324 (1.84)** | 273 (1.55)* |
| \multicolumn{8}{c}{T-peel after overnight water soak} | | | | | | | |
| 1 | 808.24PE | 92LBT | PE//PET | 141 (0.85)[2] | 182 (1.09)[2] | 42 (0.25)[2] | 47 (0.28)[2] |
| 2 | 808.24PE | Foil prelam. | PE//Foil | 237 (1.34) | 239 (1.34) | 752 (4.31) | 657 (3.84) |
| 3 | 75 SLP | 75 SLP | OPP/OPP | 566 (3.29)[1] | 309 (1.75)[1] | 566 (3.29)[1] | 529 (3.07)[1] |
| 4 | 75 SLP | MOPP | OPP/metallized OPP | 127 (0.76)[2] | 112 (0.67)[2] | 144 (0.86)* | 232 (1.3)* |
| \multicolumn{4}{l}{Mix ratio, weight basis A/B} | 47.5/52.5 | 48.25/51.75 | 49.4/50.6 | 50.1/49.9 | | | |

[1] Film Failure (max peel value)
[2] Adhesive Failure (adhesive only on primary, ave)
Cohesive Failure (adh on both films, ave.) on all others
*partial metal transfer
**100% metal transfer

What is claimed is:

1. A two-component bonding agent composition comprising:
   (a) an isocyanate component comprising an isocyanate-terminated prepolymer having polymerized residues of at least one difunctional aromatic isocyanate and at least one difunctional polymer of ethylene oxide, propylene oxide or a combination thereof, wherein said at least one difunctional polymer has $M_n$ from 300 to 650;
   (b) a polyol component comprising a triglyceride having hydroxyl functional groups and 0.05 to 0.5 wt % of a phosphoric acid and 0.2 to 4 wt % of a hydroxy-terminated polyester having polymerized residues of at least one $C_2$-$C_6$ diol, at least one $C_4$-$C_{10}$ diacid, anhydride or combination thereof, and at least one triol; wherein said hydroxy-terminated polyester has a hydroxyl functionality greater than 2 and $M_w$ from 3,000 to 8,000.

2. The composition of claim 1 in which said at least one difunctional aromatic isocyanate is diphenylmethane diisocyanate.

3. The composition of claim 2 in which the hydroxy-terminated polyester comprises polymerized residues of at least one of: (i) an anhydride selected from the group consisting of maleic anhydride and tetrahydrophthalic anhydride; and (ii) a diacid; and at least one of diethylene glycol, ethylene glycol, neopentyl glycol, 1,6-hexanediol, dipropylene glycol, propylene glycol, 1,4-butanediol, 2-methyl-1,3-propanediol; and wherein the hydroxy-terminated polyester has $M_w$ from 3,500 to 8,000.

4. A method for producing a two-component bonding agent composition by preparing: (a) an isocyanate component comprising at least one difunctional aromatic isocyanate and at least one difunctional polymer of ethylene oxide, propylene oxide or a combination thereof, wherein said at least one difunctional polymer has $M_n$ from 300 to 650; wherein the difunctional aromatic isocyanate is present in excess; and (b) a polyol component comprising a triglyceride having hydroxyl functional groups; wherein 0.05 to 0.5 wt % of a phosphoric acid and 0.2 to 4 wt % of a hydroxy-terminated polyeste having polymerized residues of at least one aliphatic $C_2$-$C_6$ diol, at least one aliphatic $C_4$-$C_{10}$ diacid, anhydride or combination thereof, and at least one triol; wherein said hydroxy-terminated polyesters have a hydroxyl functionality greater than 2 and $M_w$ from 3,000 to 8,000 are added to the polyol component.

5. The method of claim 4 in which said at least one difunctional aromatic isocyanate is diphenylmethane diisocyanate.

6. The method of claim 5 in which the hydroxy-terminated polyester comprises polymerized residues of at least one of: (i) an anhydride selected from the group consisting of maleic anhydride and tetrahydrophthalic anhydride; and (ii) a diacid; and at least one of diethylene glycol, ethylene glycol, neopentyl glycol, 1,6-hexanediol, dipropylene glycol, propylene glycol, 1,4-butanediol, 2-methyl-1,3-propanediol; and wherein the hydroxy-terminated polyester has $M_w$ from 3,500 to 8,000.

7. The method of claim 6 in which the hydroxy-terminated polyester has $M_w$ from 4,000 to 7,000 and in which the polyol component comprises 0.05 to 0.3 wt % of a phosphoric acid and 1 to 3.5 wt % of a hydroxy-terminated polyester.

8. The method of claim 7 in which the triglyceride having hydroxyl functional groups is castor oil.

9. The method of claim 8 in which said at least one difunctional aromatic isocyanate is diphenylmethane diisocyanate.

* * * * *